US012097855B2

(12) United States Patent
Hirakuri

(10) Patent No.: US 12,097,855 B2
(45) Date of Patent: Sep. 24, 2024

(54) CONTROLLER AND CONTROL METHOD FOR OPERATION OF MOTORCYCLE

(71) Applicant: Robert Bosch GmbH, Stuttgart (DE)

(72) Inventor: Kazuhiko Hirakuri, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 17/777,095

(22) PCT Filed: Nov. 4, 2020

(86) PCT No.: PCT/IB2020/060387
§ 371 (c)(1),
(2) Date: May 16, 2022

(87) PCT Pub. No.: WO2021/094877
PCT Pub. Date: May 20, 2021

(65) Prior Publication Data
US 2022/0410896 A1     Dec. 29, 2022

(30) Foreign Application Priority Data

Nov. 14, 2019    (JP) .................................. 2019-206434

(51) Int. Cl.
*B60W 30/16*      (2020.01)
*B60W 30/09*      (2012.01)
(Continued)

(52) U.S. Cl.
CPC ............ *B60W 30/16* (2013.01); *B60W 30/09* (2013.01); *B60W 50/16* (2013.01); *B62J 50/21* (2020.02);
(Continued)

(58) Field of Classification Search
None
See application file for complete search history.

(56) References Cited

U.S. PATENT DOCUMENTS 5,781,103 A    7/1998   Gilling
6,362,729 B1   3/2002   Hellmann et al.
(Continued)

FOREIGN PATENT DOCUMENTS

| DE | 102007053274 A1 | 5/2009 |
|---|---|---|
| WO | 2018172870 A1 | 9/2018 |
| WO | 2019037954 A1 | 2/2019 |

OTHER PUBLICATIONS

International Search Report and Written Opinion for Application No. PCT/IB2020/060387 dated Jan. 29, 2021 (10 pages).
(Continued)

*Primary Examiner* — Todd Melton
(74) *Attorney, Agent, or Firm* — Michael Best & Friedrich LLP

(57) ABSTRACT

The present invention obtains a controller and a control method capable of improving safety of adaptive cruise operation in a motorcycle. In the controller for operation of the motorcycle, to which a surrounding environment detector is mounted, an adaptive cruise operation performing section controls deceleration to be generated by the motorcycle in adaptive cruise operation to be equal to or lower than an upper limit value or to be lower than the upper limit value, determines a collision possibility of the motorcycle on the basis of the upper limit value during the adaptive cruise operation, and performs warning operation that acts on a tactile organ of a rider of the motorcycle when determining that the collision possibility is high.

14 Claims, 2 Drawing Sheets

(51) Int. Cl.
*B60W 50/16* (2020.01)
*B62J 50/21* (2020.01)

(52) U.S. Cl.
CPC ..... *B60W 2300/36* (2013.01); *B60W 2540/12* (2013.01); *B60W 2720/106* (2013.01)

(56) References Cited

U.S. PATENT DOCUMENTS 11,189,166 B2 * 11/2021 Giraud ................. G01S 17/931
2011/0040467 A1 2/2011 Breuer

OTHER PUBLICATIONS

Savino et al., "Decision logic of an active braking system for powered two wheelers", Proceedings of the Institution of Mechanical Engineers, Part D: Journal of Automobile Engineering, 2012, vol. 226, No. 8, pp. 1026-1036.
BMW, "Riders Manual R 1200 GS", 2016, 1st Edition, pp. 1-247.

* cited by examiner

[FIG. 1]
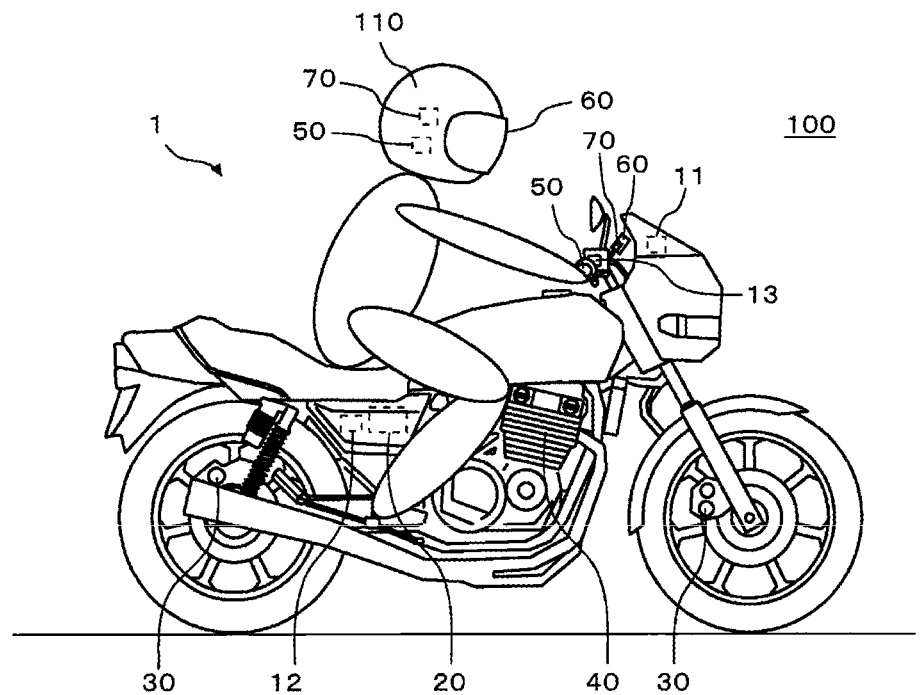
[FIG. 2]
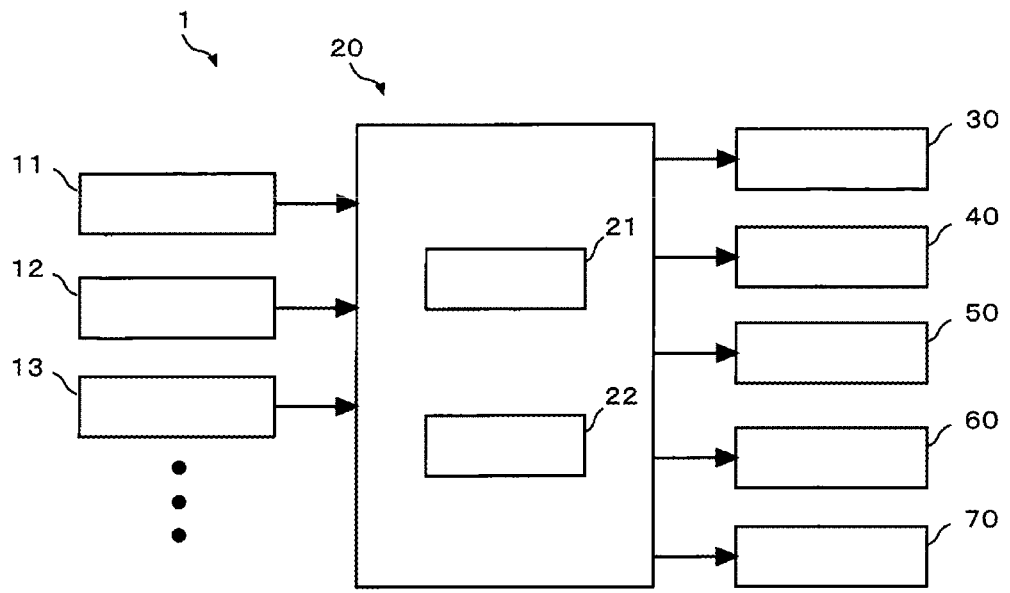

[FIG. 3]
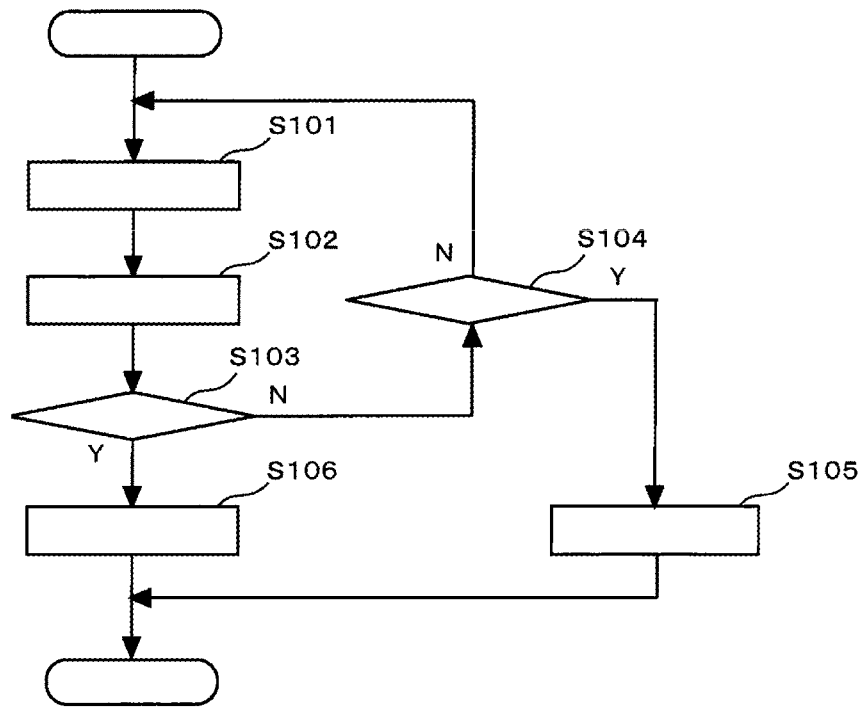
[FIG. 4]
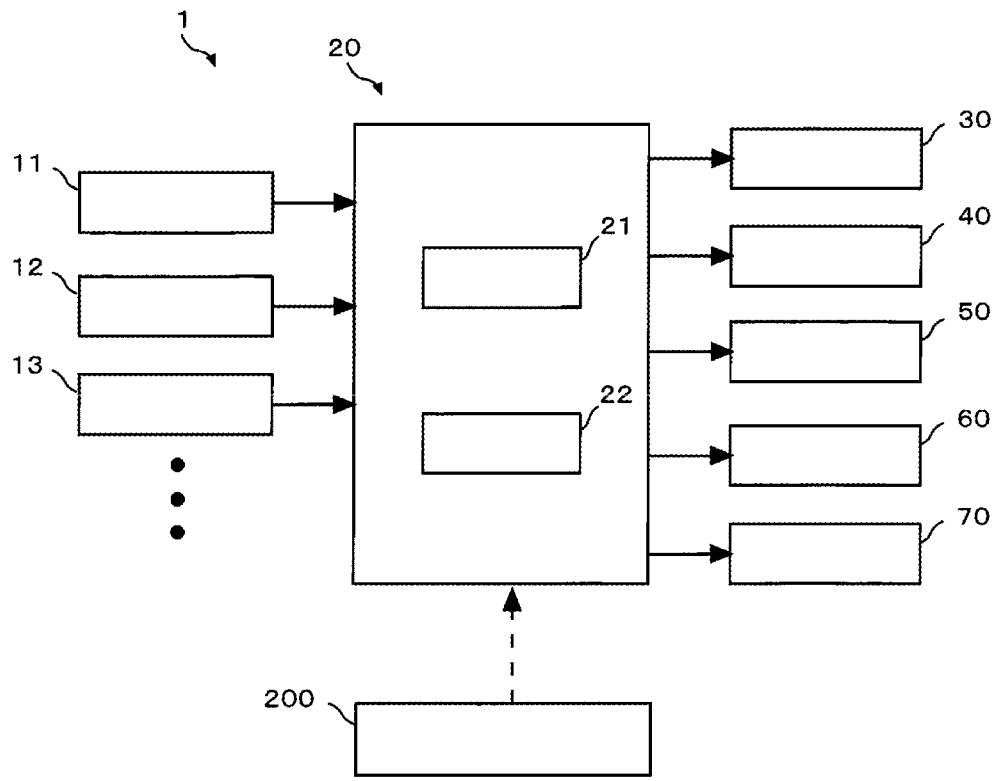

CONTROLLER AND CONTROL METHOD FOR OPERATION OF MOTORCYCLE

BACKGROUND OF THE INVENTION

The present invention relates to a controller for operation of a motorcycle to which a surrounding environment detector is mounted and to a control method for the operation of the motorcycle to which the surrounding environment detector is mounted.

A technique of making a motorcycle (a two-wheeled motor vehicle or a three-wheeled motor vehicle) perform adaptive cruise operation has been known. The adaptive cruise operation is operation to make the motorcycle travel according to a distance from the motorcycle to a preceding vehicle, motion of the motorcycle, and a rider's instruction.

CITATION LIST

Patent Literature

PTL 1: WO 2018/172870

SUMMARY OF THE INVENTION

By the way, in the case where the motorcycle performs the adaptive cruise operation while generating acceleration/deceleration to such an extent that a safety problem does not occur to another vehicles (for example, a passenger car, a truck, or the like with four wheels), a situation where the rider who gets shocked by a speed change turns over the motorcycle possibly occurs due to likelihood of unstable vehicle body behavior of the motorcycle during travel in comparison with the other vehicle. Thus, in the case where the motorcycle performs the adaptive cruise operation, it is necessary to limit the deceleration generated to the motorcycle to be low during such operation. Then, in a situation where the deceleration that exceeds the limit value is required, the adaptive cruise operation is desirably canceled so as to make the rider himself/herself maneuver the motorcycle. However, a method for reliably urging the motorcycle rider to maneuver the motorcycle during performance of the adaptive cruise operation under such a situation has not been established.

The present invention has been made with the above-described problem as the background and therefore obtains a controller and a control method capable of improving safety of adaptive cruise operation of a motorcycle.

Solution to Problem

A controller according to the present invention is a controller for operation of a motorcycle, to which a surrounding environment detector is mounted, and includes: an acquisition section that acquires surrounding environment information of the motorcycle on the basis of output of the surrounding environment detector during travel of the motorcycle; and an adaptive cruise operation performing section that makes the motorcycle perform adaptive cruise operation on the basis of the surrounding environment information acquired by the acquisition section. The adaptive cruise operation performing section controls deceleration to be generated by the motorcycle in the adaptive cruise operation to be equal to or lower than an upper limit value or to be lower than the upper limit value, during the adaptive cruise operation, determines a collision possibility of the motorcycle on the basis of the upper limit value, and, when determining that the collision possibility is high, performs warning operation that acts on a tactile organ of a rider of the motorcycle.

A control method according to the present invention is a control method for operation of a motorcycle, to which a surrounding environment detector is mounted, and includes: an acquisition step in which an acquisition section of a controller acquires surrounding environment information of the motorcycle on the basis of output of the surrounding environment detector during travel of the motorcycle; and an adaptive cruise operation performing step in which an adaptive cruise operation performing section of the controller makes the motorcycle perform adaptive cruise operation on the basis of the surrounding environment information acquired in the acquisition step. In the adaptive cruise operation performing step, the adaptive cruise operation performing section controls deceleration to be generated by the motorcycle in the adaptive cruise operation to be equal to or lower than an upper limit value or to be lower than the upper limit value, and during the adaptive cruise operation, determines a collision possibility of the motorcycle on the basis of the upper limit value, and, when determining that the collision possibility is high, performs warning operation that acts on a tactile organ of a rider of the motorcycle.

Advantageous Effects of Invention

In the controller and the control method according to the present invention, the adaptive cruise operation performing section controls the deceleration to be generated by the motorcycle in the adaptive cruise operation to be equal to or lower than the upper limit value or to be lower than the upper limit value, determines the collision possibility of the motorcycle on the basis of the upper limit value during the adaptive cruise operation, and, when determining that the collision possibility is high, performs the warning operation that acts on the tactile organ of the rider of the motorcycle. In the motorcycle, there is a case where frequency of visual recognition of the display, which is provided to the motorcycle, by the rider is reduced due to the rider's riding posture. In addition, there is a high possibility that the adaptive cruise operation is performed in a high-speed range. In such a situation, loud noise such as wind noise makes it difficult to hear a warning due to a fact that the rider's riding space is not surrounded by a vehicle body. Meanwhile, the controller and the control method according to the present invention can urge the rider himself/herself to maneuver the motorcycle with high reliability by the warning that acts on the tactile organ in a situation where the deceleration exceeding the upper limit value is required. Thus, safety of the adaptive cruise operation in the motorcycle is improved.

BRIEF DESCRIPTION OF THE DRAWINGS

FIG. 1 is a view of a mounted state of a rider-assistance system according to a first embodiment of the present invention to a motorcycle.

FIG. 2 is a diagram for illustrating a system configuration of the rider-assistance system according to the first embodiment of the present invention.

FIG. 3 is a chart of an example of a control flow in a controller of the rider-assistance system according to the first embodiment of the present invention.

FIG. 4 is a diagram for illustrating a system configuration of a rider-assistance system according to a second embodiment of the present invention.

DETAILED DESCRIPTION

A description will hereinafter be made on a controller and a control method according to the present invention with reference to the drawings.

A term "motorcycle" means a two-wheeled motor vehicle or a three-wheeled motor vehicle among straddle-type vehicles straddled by riders. The motorcycles include: the two-wheeled motor vehicle or the three-wheeled motor vehicle that has an engine as a propelling source; the two-wheeled motor vehicle or the three-wheeled motor vehicle that has a motor as the propelling source; and the like, and examples of the motorcycles are a bike, a scooter, and an electric scooter. The following description will be made on a case where the motorcycle is the two-wheeled motor vehicle. However, the motorcycle may be the three-wheeled motor vehicle.

A configuration, operation, and the like, which will be described below, merely constitute one example. The controller and the control method according to the present invention are not limited to a case with such a configuration, such operation, and the like. The same or similar description will appropriately be simplified or will not be made below. In the drawings, the same or similar members or portions will not be denoted by a reference sign or will be denoted by the same reference sign. In addition, a detailed structure will appropriately be illustrated in a simplified manner or will not be illustrated.

First Embodiment

A description will hereinafter be made on a rider-assistance system according to a first embodiment.

Configuration of Rider-Assistance System

A description will be made on a configuration of the rider-assistance system according to the first embodiment.

FIG. 1 is a view of amounted state of the rider-assistance system according to the first embodiment of the present invention to the motorcycle. FIG. 2 is a diagram for illustrating a system configuration of the rider-assistance system according to the first embodiment of the present invention.

As illustrated in FIG. 1 and FIG. 2, a rider-assistance system 1 is mounted to a motorcycle 100. The rider-assistance system 1 at least includes: a surrounding environment detector 11 that detects surrounding environment in front of the motorcycle 100; a travel state detector 12 that detects a travel state of the motorcycle 100; an input device 13 operated by the rider; and a controller (ECU) 20.

The surrounding environment detector 11 monitors an area in front of the motorcycle 100 and detects various types of information on the area in front of the motorcycle 100. More specifically, the surrounding environment detector 11 specifies a follow-up vehicle for speed control of the motorcycle 100 in adaptive cruise operation. The surrounding environment detector 11 also detects a distance from the motorcycle 100 to the follow-up vehicle. The surrounding environment detector 11 may detect another physical quantity that can substantially be converted to the distance from the motorcycle 100 to the follow-up vehicle.

Here, in the case where plural preceding vehicles travel in front of the motorcycle 100, the surrounding environment detector 11 selects the vehicle that travels at the closest position to the motorcycle 100 on the same lane as a travel lane of the motorcycle 100 as the follow-up vehicle for the speed control of the motorcycle 100. At this time, in addition to behavior of the vehicle that travels at the closest position to the motorcycle 100 on the same lane as the travel lane of the motorcycle 100, behavior of the vehicle traveling ahead of several vehicles in front of the motorcycle 100, behavior of the vehicle traveling on an adjacent lane to the travel lane of the motorcycle 100, and the like may be added to the adaptive cruise operation.

As the surrounding environment detector 11, for example, a camera that captures an image in front of the motorcycle 100 and a radar that can detect a distance from the motorcycle 100 to a target in front are used. In such a case, for example, white lines, guardrails, and the like are recognized by using the image captured by the camera. Then, by using recognition results of these and a detection result by the radar, the distance from the motorcycle 100 to the follow-up vehicle can be detected. The surrounding environment detector 11 is provided to a front portion of a vehicle body, for example. The configuration of the surrounding environment detector 11 is not limited to that in the above example. For example, the functions of specifying the follow-up vehicle and detecting the distance from the motorcycle 100 to the follow-up vehicle may be implemented only by the radar or may be implemented by a stereo camera.

The travel state detector 12 includes a front-wheel rotational frequency sensor, a rear-wheel rotational frequency sensor, and the like, for example. Each of the front-wheel rotational frequency sensor and the rear-wheel rotational frequency sensor detects a rotational frequency of the respective wheel, and outputs a detection result. Each of the front-wheel rotational frequency sensor and the rear-wheel rotational frequency sensor may detect another physical quantity that can substantially be converted to the rotational frequency of the wheel.

The travel state detector 12 further includes a braking force measurement unit, a drive power measurement unit, and the like, for example. For example, the braking force measurement unit outputs detection results such as of an operation amount of a brake system 30 by the rider (representatively, an operation amount of a brake lever, a brake pedal, or the like), an actual braking force generated by the brake system 30, and the like. The braking force measurement unit may detect other physical quantities that can substantially be converted to the operation amount of the brake system 30 by the rider and the actual braking force generated by the braking system 30. For example, the drive power measurement unit outputs detection results such as an operation amount of a drive device 40 by the rider (representatively, an operation amount of a throttle grip or the like) and actual drive power generated by the drive device 40. The drive power measurement unit may detect other physical quantities that can substantially be converted to the operation amount of the drive device 40 by the rider and the actual drive power generated by the drive device 40.

The input device 13 accepts a travel mode selection operation by the rider. As will be described later, in the motorcycle 100, the controller 20 can perform the adaptive cruise operation. The adaptive cruise operation corresponds to an example of cruise operation in which acceleration/deceleration of the motorcycle 100 is automatically controlled without relying on an accelerating/decelerating operation by the rider, and is control that makes the motorcycle 100 travel according to the distance from the motorcycle 100 to the preceding vehicle (that is, the follow-up vehicle), motion of the motorcycle 100, and the rider's instruction. By using the input device 13, the rider can select, as one of the travel modes, a travel mode in which the adaptive cruise operation is performed. In addition, by using the input device 13, the rider can input a set speed of the motorcycle 100 in the adaptive cruise operation. For example, as the input device 13, a lever, a button, a touchscreen, or the like is used. The input device 13 is provided to a handlebar, for example.

The controller 20 controls operation of the motorcycle 100. For example, the controller 20 is partially or entirely constructed of a microcomputer, a microprocessor unit, or the like. Alternatively, the controller 20 may partially or entirely be constructed of a member in which firmware or the like can be updated, or may partially or entirely be a program module or the like that is executed by a command from a CPU or the like, for example. The controller 20 may be provided as one unit or may be divided into multiple units, for example.

The controller 20 includes an acquisition section 21 and an adaptive cruise operation performing section 22.

The acquisition section 21 acquires information that is output from each of the devices mounted to the motorcycle 100, and outputs the acquired information to the adaptive cruise operation performing section 22. More specifically, the acquisition section 21 acquires surrounding environment information on the basis of information output from the surrounding environment detector 11, acquires travel state information of the motorcycle 100 on the basis of information output from the travel state detector 12, and acquires rider setting information on the basis of information output from the input device 13. The travel state information includes information on a speed, the acceleration/deceleration, a position, and an advancing direction of the motorcycle 100, for example.

The adaptive cruise operation performing section 22 controls operation of each of the devices (the brake system 30, the drive device 40, and the like) mounted to the motorcycle 100, so as to control the braking force and the drive power to be generated by the motorcycle 100. In this way, the adaptive cruise operation performing section 22 controls the acceleration/deceleration (that is, the speed) of the motorcycle 100 and performs the adaptive cruise operation. More specifically, in the case where the acquisition section 21 acquires the rider setting information indicating that the rider has selected the travel mode in which the adaptive cruise operation is performed, the adaptive cruise operation performing section 22 performs the adaptive cruise operation on the basis of the surrounding environment information and the travel state information. In the case where the rider performs the operation (for example, the operation of the brake system 30, the operation of the drive device 40, or the like) during the adaptive cruise operation, the adaptive cruise operation performing section 22 cancels the adaptive cruise operation.

In the adaptive cruise operation, the acceleration/deceleration of the motorcycle 100 is basically controlled such that the distance from the motorcycle 100 to the follow-up vehicle approximates a target distance. As the distance from the motorcycle 100 to the follow-up vehicle, the target distance is set to a value with which the rider's safety can be secured. In the case where no preceding vehicle is recognized, the acceleration/deceleration of the motorcycle 100 is controlled such that the speed of the motorcycle 100 becomes the set speed set by the rider. Meanwhile, in the case where the preceding vehicle is recognized, the acceleration/deceleration of the motorcycle 100 is controlled such that the speed of the motorcycle 100 becomes equal to or lower than the set speed set by the rider.

More specifically, during the adaptive cruise operation, the adaptive cruise operation performing section 22 calculates target acceleration/deceleration, at which the distance from the motorcycle 100 to the follow-up vehicle approximates the target distance, on the basis of a comparison result between the distance from the motorcycle 100 to the follow-up vehicle and the target distance and on the basis of a relative speed between the motorcycle 100 and the follow-up vehicle. Then, the adaptive cruise operation performing section 22 controls the acceleration/deceleration of the motorcycle 100 to the target acceleration/deceleration.

For example, in the case where the distance from the motorcycle 100 to the follow-up vehicle is longer than the target distance, the adaptive cruise operation performing section 22 calculates, as the target acceleration/deceleration, the acceleration that corresponds to a difference between the distance from the motorcycle 100 to the follow-up vehicle and the target distance. On the other hand, in the case where the distance from the motorcycle 100 to the follow-up vehicle is shorter than the target distance, the adaptive cruise operation performing section 22 calculates, as the target acceleration/deceleration, the deceleration that corresponds to the difference between the distance from the motorcycle 100 to the follow-up vehicle and the target distance. In addition, in the case where the target acceleration/deceleration based on the set speed is lower than the target acceleration/deceleration based on the target distance in a situation where the follow-up vehicle is specified, the adaptive cruise operation performing section 22 controls the acceleration/deceleration of the motorcycle 100 to the target acceleration/deceleration based on the set speed.

Here, the adaptive cruise operation performing section 22 controls the deceleration to be generated by the motorcycle 100 in the adaptive cruise operation to be equal to or lower than an upper limit value or to be lower than the upper limit value. The upper limit value is set to such a value that, even in the case where the deceleration of the value is generated to the motorcycle 100 in an unexpected state by the rider, the motorcycle 100 can safely be traveled by the rider. The upper limit value may be variable depending on the travel state information, may be variable by the rider, or may be a fixed value. Then, based on the upper limit value, the adaptive cruise operation performing section 22 determines a degree of a collision possibility of the motorcycle 100.

More specifically, the adaptive cruise operation performing section 22 determines the collision possibility of the motorcycle 100 with the follow-up vehicle on the basis of the upper limit value and travel information of the follow-up vehicle that is acquired by the acquisition section 21 on the basis of the output of the surrounding environment detector 11. The travel information includes information on a speed, acceleration/deceleration, a position, and an advancing direction of the follow-up vehicle, for example. For example, the adaptive cruise operation performing section 22 determines whether the motorcycle 100 collides with the follow-up vehicle after a reference period on the basis of the speed of a case where the motorcycle 100 travels at the deceleration corresponding to the upper limit value for the reference period, an advancing distance during such a period, the speed of a case where the follow-up vehicle travels at the acceleration/deceleration at a current time point for the reference period, and an advancing distance during such a period. The reference period is preferably set to be longer than a period that is required by the rider to complete collision avoidance operation by maneuvering his/her own motorcycle 100 after cancellation of the adaptive cruise operation. The adaptive cruise operation performing section 22 may determine such a state that the distance from the motorcycle 100 to the follow-up vehicle after the reference period becomes equal to or shorter than a reference distance or becomes shorter than the reference distance as a state where the collision possibility is high. The reference distance is preferably set by adding the upper limit value of the deceleration that is possibly generated by the follow-up vehicle, a lack of the rider's driving skill, worsening of a road surface condition, or the like.

In addition, more specifically, the adaptive cruise operation performing section 22 determines the collision possibility of the motorcycle 100 on the basis of the upper limit value thereof and information on an obstacle present on a travel path of the motorcycle 100, and the information on the obstacle is acquired by the acquisition section 21 on the basis of the output of the surrounding environment detector 11. The obstacles include a vehicle, a road facility, a fallen object, a living creature such as a person that enter the travel lane of the motorcycle 100. For example, the adaptive cruise operation performing section 22 determines whether the motorcycle 100 collides with the obstacle after a reference period on the basis of the speed of the case where the motorcycle 100 travels at the deceleration corresponding to the upper limit value for the reference period, the advancing distance during such a period, and a position of the obstacle. The reference period is preferably set to be longer than a period that is required by the rider to complete the collision avoidance operation by maneuvering his/her own motorcycle 100 after the cancellation of the adaptive cruise operation. The adaptive cruise operation performing section 22 may determine such a state that a distance from the motorcycle 100 to the obstacle after the reference period becomes equal to or shorter than a reference distance or becomes shorter than the reference distance as the state where the collision possibility is high. The reference distance is preferably set by adding the lack of the rider's driving skill, worsening of the road surface condition, or the like.

When determining that the collision possibility of the motorcycle 100 is high, the adaptive cruise operation performing section 22 performs warning operation that acts on a tactile organ of the rider of the motorcycle 100. After the warning operation, the adaptive cruise operation performing section 22 may continue the adaptive cruise operation until the rider cancels the adaptive cruise operation, or may forcibly terminate the adaptive cruise operation before the rider cancels the adaptive cruise operation. The forcible termination may be conducted after the warning operation, may be conducted simultaneously with the warning operation, or may be conducted before the warning operation.

More specifically, as the warning operation, the adaptive cruise operation performing section 22 causes the motorcycle 100 to instantaneously generate the deceleration that exceeds the upper limit value of the deceleration in the adaptive cruise operation. Such deceleration may be generated when the brake system 30 instantaneously generates the braking force. Alternatively, such deceleration may be generated when the braking force generated by the brake system 30 is instantaneously increased. Further alternatively, such deceleration may be generated when the drive power generated by the drive device 40 is instantaneously reduced. Such instantaneous deceleration may be generated once or may repeatedly be generated for plural times. For the instantaneous deceleration, such deceleration and such a period that the rider can feel a behavioral change of the vehicle body are preferably set.

Alternatively, more specifically, as the warning operation, the adaptive cruise operation performing section 22 causes a vibrator 50 provided to the motorcycle 100 to vibrate. For example, the vibrator 50 is preferably provided to a portion of the handlebar of the motorcycle 100, a portion of a trunk of the motorcycle 100, or the like, and such a portion comes in contact with the rider's body. The vibrator 50 may be provided to the rider's gear such as a helmet 110. Even in such a case, the adaptive cruise operation performing section 22 can control the vibrator 50 through wireless communication or the like.

In addition to those types of the warning operation, the adaptive cruise operation performing section 22 may perform the warning operation that acts on a visual organ of the rider by outputting a command to a display 60 provided to the motorcycle 100 or the rider's gear, or may perform the warning operation that acts on an auditory organ of the rider by outputting a command to a speaker 70 provided to the motorcycle 100 or the rider's gear. The vibrator 50, the display 60, and the speaker 70 may entirely or partially be provided integrally or may be provided separately.

Operation of Rider-Assistance System

A description will be made on the operation of the rider-assistance system according to the first embodiment.

FIG. 3 is a chart of an example of a control flow in the controller of the rider-assistance system according to the first embodiment of the present invention.

The controller 20 executes the control flow illustrated in FIG. 3 after the adaptive cruise operation is activated in the input device 13.

Acquisition Step

In step S101, the acquisition section 21 acquires the surrounding environment information on the basis of the information output from the surrounding environment detector 11, acquires the travel state information of the motorcycle 100 on the basis of the information output from the travel state detector 12, and acquires the rider setting information on the basis of the information output from the input device 13.

Adaptive Cruise Operation Performing Step

In step S102, the adaptive cruise operation performing section 22 controls the operation of each of the devices (the brake system 30, the drive device 40, and the like) mounted to the motorcycle 100 on the basis of the surrounding environment information, the rider setting information, and the travel state information acquired in step S101, so as to make the motorcycle 100 perform the adaptive cruise operation.

In step S103, the adaptive cruise operation performing section 22 determines the collision possibility of the motorcycle 100 on the basis of the upper limit value of the deceleration generated by the motorcycle 100 in the adaptive cruise operation. If it is determined that the collision possibility is high, the processing proceeds to step S106. If not, the processing proceeds to step S104.

In step S104, the adaptive cruise operation performing section 22 determines presence or absence of cancellation operation of the adaptive cruise operation by the rider. If the cancellation operation is present, the processing proceeds to step S105, the adaptive cruise operation performing section 22 terminates the adaptive cruise operation, and the control flow is terminated. If the cancellation operation is absent, the processing in step S101 is executed again.

In step S106, When the adaptive cruise operation performing section 22 performs the warning operation that acts on the tactile organ of the rider of the motorcycle 100, the control flow is terminated by the cancellation of the adaptive cruise operation.

Effects of Rider-Assistance System

A description will be made on effects of the rider-assistance system according to the first embodiment.

In the rider-assistance system 1, the adaptive cruise operation performing section 22 controls the deceleration, which is generated by the motorcycle 100 in the adaptive cruise operation, to be equal to or lower than the upper limit value or to be lower than the upper limit value, and determines the collision possibility of the motorcycle 100 on the basis of the upper limit value during the adaptive cruise operation. In the case where it is determined that the collision possibility is high, the adaptive cruise operation performing section 22 performs the warning operation that acts on the tactile organ of the rider of the motorcycle 100. In the motorcycle 100, there is a case where frequency of visual recognition of the display 60, which is provided to the motorcycle 100, by the rider is reduced due to the rider's riding posture. In addition, there is a high possibility that the adaptive cruise operation is performed in a high-speed range. In such a situation, loud noise such as wind noise makes it difficult to hear a warning due to a fact that the rider's riding space is not surrounded by the vehicle body. Meanwhile, the rider-assistance system 1 can urge the rider himself/herself to maneuver the motorcycle 100 with high reliability by the warning that acts on the tactile organ in a situation where the deceleration exceeding the upper limit value is required. Thus, the safety of the adaptive cruise operation in the motorcycle 100 is improved.

Preferably, the warning operation is the operation that instantaneously causes the motorcycle 100 to generate the deceleration, which exceeds the upper limit value of the deceleration generated by the motorcycle 100 in the adaptive cruise operation. With such a configuration, the rider-assistance system 1 can be simplified by adopting control of the existing brake system 30 or the existing drive device 40, and a braking distance can be shortened by causing the motorcycle 100 to generate the deceleration at a stage before initiation of the maneuver by the rider. As a result, the safety of the adaptive cruise operation in the motorcycle 100 can further be improved.

Preferably, the warning operation is the operation that causes the vibrator 50 provided to the motorcycle 100 or the vibrator 50 provided to the rider's gear to vibrate. With such a configuration, the warning that acts on the tactile organ can urge the rider himself/herself to maneuver the motorcycle 100 with no influence on the behavior of the vehicle body. As a result, the safety is improved.

Preferably, after performing the warning operation, the adaptive cruise operation performing section 22 continues the adaptive cruise operation until the rider performs the cancellation operation of the adaptive cruise operation. With such a configuration, the cancellation of the adaptive cruise operation despite the rider's intention, which confuses the rider, can be prevented.

Preferably, after determining that the collision possibility is high, the adaptive cruise operation performing section 22 forcibly terminates the adaptive cruise operation prior to the cancellation operation of the adaptive cruise operation by the rider. With such a configuration, in the case where it is expected that the higher deceleration than the upper limit value of the deceleration in the adaptive cruise operation is generated by the motorcycle 100 due to the forcible termination of the adaptive cruise operation, it is possible to simplify the rider's avoidance operation in advance and thus improve the safety. An example of such a case is that, in the situation where the adaptive cruise operation is performed in the high-speed range, the drive power of the drive device 40 is significantly reduced due to the forcible termination of the adaptive cruise operation.

Second Embodiment

A description will hereinafter be made on a rider-assistance system according to a second embodiment. A description will hereinafter be made only on a part that differs from the rider-assistance system according to the first embodiment.

Configuration and Operation of Rider-Assistance System

A description will be made on a configuration and operation of the rider-assistance system according to the second embodiment.

FIG. 4 is a diagram for illustrating a system configuration of the rider-assistance system according to the second embodiment of the present invention.

As illustrated in FIG. 4, during the adaptive cruise operation, the acquisition section 21 acquires the travel information of the follow-up vehicle or the information on the obstacle not on the basis of the output of the surrounding environment detector 11 but on the basis of output of a communication device 200 provided to the follow-up vehicle or a road facility. The acquisition section 21 may directly acquire the travel information of the follow-up vehicle or the information on the obstacle from the communication device 200 or may acquire such information via another external equipment such as a server.

In step S103 of the control flow illustrated in FIG. 3, the adaptive cruise operation performing section 22 determines the collision possibility of the motorcycle 100 with the follow-up vehicle on the basis of the upper limit value of the deceleration to be generated by the motorcycle 100 in the adaptive cruise operation and on the basis of the travel information of the follow-up vehicle acquired by the acquisition section 21 on the basis of output of the communication device 200. In step S103 of the control flow illustrated in FIG. 3, the adaptive cruise operation performing section 22 determines the collision possibility of the motorcycle 100 on the basis of the upper limit value of the deceleration to be generated by the motorcycle 100 in the adaptive cruise operation and on the basis of the information on the obstacle present on the travel path of the motorcycle 100 acquired by the acquisition section 21 on the basis of the output of the communication device 200.

That is, in the rider-assistance system according to the second embodiment, for the determination on the collision possibility of the motorcycle 100, the travel information of the follow-up vehicle or the information on the obstacle is acquired not on the basis of the output of the surrounding environment detector 11 but on the basis of the output of the communication device 200 provided to the follow-up vehicle or the road facility. Even with such a configuration, the similar effects can be obtained by the similar operation to that of the rider-assistance system according to the first embodiment.

The description has been made so far on the first embodiment and the second embodiment. However, the present invention is not limited to the description of each of the embodiments. For example, only a part of each of the embodiments may be implemented, or all or parts of the embodiments may be combined. In addition, for example, an order of steps in the control flow illustrated in FIG. 3 may be switched. Furthermore, another step may be added to the control flow illustrated in FIG. 3.

REFERENCE SIGNS LIST

1: Rider-assistance system
11: Surrounding environment detector
12: Travel state detector
13: Input device
20: Controller
21: Acquisition section
22: Adaptive cruise operation performing section
30: Brake system
40: Drive device
50: Vibrator
60: Display
70: Speaker
100: Motorcycle
110: Helmet
200: Communication device

The invention claimed is:

1. A controller (20) for operation of a motorcycle (100), to which a surrounding environment detector (11) is mounted, the controller configured to:
acquire surrounding environment information of the motorcycle (100) on the basis of output of the surrounding environment detector (11) during travel of said motorcycle (100);
make the motorcycle (100) perform an adaptive cruise operation on the basis of the surrounding environment information acquired by the acquisition section (21), wherein
the controller (20) controls deceleration to be generated by the motorcycle (100) in the adaptive cruise operation to be equal to or lower than an upper limit value, and
during the adaptive cruise operation, determines a collision possibility of the motorcycle (100) on the basis of the upper limit value, and, when determining that said collision possibility is high, performs warning operation that acts on a tactile organ of a rider of said motorcycle (100).

2. The controller according to claim 1, wherein the warning operation is operation that causes the motorcycle (100) to instantaneously generate the deceleration exceeding the upper limit value.

3. The controller according to claim 1, wherein the warning operation is operation that causes a vibrator (50) provided to the motorcycle (100) to vibrate.

4. The controller according to claim 1, wherein the warning operation is operation that causes a vibrator (50) provided to the rider's gear to vibrate.

5. The controller according to claim 1, wherein after performing the warning operation, the controller (20) continues the adaptive cruise operation until the rider performs cancellation operation of said adaptive cruise operation.

6. The controller according to claim 5, wherein the cancellation operation is operation that the rider operates a brake system (30) of the motorcycle (100).

7. The controller according to claim 5, wherein the cancellation operation is operation that the rider operates a drive device (40) of the motorcycle (100).

8. The controller according to claim 1, wherein after determining that the collision possibility is high, the controller (20) forcibly terminates the adaptive cruise operation before the rider performs cancellation operation of the adaptive cruise operation.

9. The controller according to claim 1, wherein the controller (20) determines the collision possibility that is a possibility of a collision of the motorcycle (100) with a follow-up vehicle on the basis of the upper limit value and travel information of said follow-up vehicle in speed control of the motorcycle (100) during the adaptive cruise operation.

10. The controller according to claim 9, wherein the controller (20) acquires the travel information on the basis of the surrounding environment information.

11. The controller according to claim 9, wherein the controller (20) determines the travel information on the basis of output of a communication device (200) mounted to the follow-up vehicle.

12. The controller according to claim 9, wherein the controller (20) determines the travel information on the basis of output of a communication device (200) provided to a road facility.

13. The controller according to claim 1, wherein the controller (20) determines the collision possibility that is a possibility of a collision of the motorcycle (100) on the basis of the upper limit value and information on an obstacle present on a travel path of the motorcycle (100).

14. A control method for operation of a motorcycle (100), to which a surrounding environment detector (11) is mounted, the control method comprising:
an acquisition step (S101) in which a controller (20) acquires surrounding environment information of the motorcycle (100) on the basis of output of the surrounding environment detector (11) during travel of said motorcycle (100); and
an adaptive cruise operation performing step (S102 to S106) in which the controller (20) makes the motorcycle (100) perform adaptive cruise operation on the basis of the surrounding environment information acquired in the acquisition step (S101), wherein
in the adaptive cruise operation performing step (S102 to S106),
the controller (20)
controls deceleration to be generated by the motorcycle (100) in the adaptive cruise operation to be equal to or lower than an upper limit value, and
during the adaptive cruise operation, determines a collision possibility of the motorcycle (100) on the basis of the upper limit value, and, when determining that said collision possibility is high, performs warning operation that acts on a tactile organ of a rider of said motorcycle (100).

* * * * *